(12) United States Patent
Sawahata

(10) Patent No.: US 8,556,434 B2
(45) Date of Patent: Oct. 15, 2013

(54) IMAGE PROJECTION APPARATUS HAVING SHUTTER MECHANISM FOR HIDING PROJECTION IMAGE

(75) Inventor: Takashi Sawahata, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 332 days.

(21) Appl. No.: 12/917,522

(22) Filed: Nov. 2, 2010

(65) Prior Publication Data

US 2011/0116056 A1    May 19, 2011

(30) Foreign Application Priority Data

Nov. 18, 2009   (JP) ................................. 2009-262643

(51) Int. Cl.

| | |
|---|---|
| G03B 21/14 | (2006.01) |
| G03B 3/00 | (2006.01) |
| G02B 9/00 | (2006.01) |
| G02B 9/08 | (2006.01) |
| G02B 15/14 | (2006.01) |

(52) U.S. Cl.
USPC ............... 353/88; 353/97; 353/101; 359/698; 359/738

(58) Field of Classification Search
USPC .......... 353/88, 89, 97, 52, 101; 352/204, 205, 352/207, 208; 359/738, 740, 227, 230, 359/649–651
See application file for complete search history.

(56) References Cited

U.S. PATENT DOCUMENTS

| | | |
|---|---|---|
| 3,205,766 A | 9/1965 | Ewald et al. |
| 5,537,168 A | 7/1996 | Kitagishi et al. |
| 2006/0066815 A1 | 3/2006 | Nakamura |
| 2008/0231818 A1 | 9/2008 | Shinozaki |

FOREIGN PATENT DOCUMENTS

| | | |
|---|---|---|
| EP | 1 972 995 A1 | 9/2008 |
| JP | 58-021726 A | 2/1983 |
| JP | 2000-019648 A | 1/2000 |
| JP | 2009-223111 A | 10/2009 |

OTHER PUBLICATIONS

Extended European Search Report issued in corresponding European Patent Application No. 10189666.0 dated Feb. 16, 2011.

*Primary Examiner* — William C Dowling
*Assistant Examiner* — Ryan Howard
(74) *Attorney, Agent, or Firm* — Rossi, Kimms & McDowell LLP

(57) ABSTRACT

An image projection apparatus 500 includes an optical modulation element 206R, 206G, 206B, a projection lens 100 configured to project light modulated by the optical modulation element onto a projection surface, an optical unit 201 configured to guide light from a light source 209 to the optical modulation element and to guide the light from the optical modulation element to the projection lens, a shutter mechanism 300 disposed between the optical unit and the projection lens and configured to operate so as to be in an open state and a closed state, and a focus corrector 501 configured to correct a focus variation generated by temperature changes of the optical unit and the projection lens by operating the projection lens based on a focus correction function. The focus corrector changes the focus correction function in accordance with information relating to an operation of the shutter mechanism.

13 Claims, 6 Drawing Sheets

IMAGE PROJECTION APPARATUS HAVING SHUTTER MECHANISM FOR HIDING PROJECTION IMAGE

BACKGROUND OF THE INVENTION

1. Field of the Invention

The present invention relates to an image projection apparatus such as a projector having a shutter mechanism for hiding a projection image.

2. Description of the Related Art

In many cases, a projector which is used in a meeting or the like repeats displaying (projection) and hiding (non-projection) images in a short time. In the projector, a high-brightness discharge lamp is commonly used as a light source, but the lifetime of the high-brightness discharge lamp gets shorter if turning on and off is repeated in a short time. The high-brightness discharge lamp needs a certain amount of time until its brightness or color is stabilized after the lamp is turned on, and also needs a certain amount of cooling time from the time of turning off the lamp to the time of turning on the lamp again.

Japanese Patent Laid-Open No. 58-21726 discloses a projector which disposes a shutter mechanism between a lamp and a projection lens to open and close it to switch displaying and hiding an image so that displaying and hiding the image can be repeated in a short time without shortening the lifetime of a high-brightness discharge lamp.

The temperatures of an optical element and a member holding it inside the projector increase by receiving light from the lamp while the lamp is lighting. Because of the temperature increase, the optical characteristic, for example refractive index, of the optical element may be changed or the holding member which holds the optical element is thermally expanded and the interval between adjacent optical elements may be changed. The change of the optical characteristic or the interval of the optical elements causes the change of the focus state of the projection image.

Japanese Patent Laid-Open No. 2000-19648 discloses a projector which disposes a temperature sensor inside a chassis and performs a focus correction operation of a projection lens in accordance with the temperature detected by the temperature sensor.

In the projector disclosed in Japanese Patent Laid-Open No. 58-21726, there is a difference of the increase way or the temperature distribution of the optical element or the holding member which holds it between states in which the shutter mechanism (hereinafter, referred to simply as a shutter) is open and closed. This is because the temperature increase does not occur in the optical element and the holding member disposed at a screen side with respect to the shutter, and the temperatures of the optical element and the holding member at a light source side with respect to the shutter additionally increases by the light reflected on the shutter. Therefore, in the projector disclosed in Japanese Patent Laid-Open No. 58-21726, the way of the change of the focus state is different depending upon the open and the close of the shutter. However, Japanese Patent Laid-Open No. 58-21726 does not disclose a corrector that corrects such focus variations.

Japanese Patent Laid-Open No. 2000-19648 does not disclose the relationship between the operation of the shutter and the correction of the focus variation.

There is a projector which performs an AF (autofocus) using reflected light from the projection image, but the focus variation cannot be corrected by using the AF because an image is not projected in a state where the shutter is closed.

SUMMARY OF THE INVENTION

An image projection apparatus as one aspect of the present invention includes an optical modulation element, a projection lens configured to project light modulated by the optical modulation element onto a projection surface, an optical unit configured to guide light from a light source to the optical modulation element and to guide the light from the optical modulation element to the projection lens, a shutter mechanism disposed between the optical unit and the projection lens and configured to operate so as to be in an open state and a closed state, and a focus corrector configured to correct a focus variation generated by temperature changes of the optical unit and the projection lens by operating the projection lens based on a focus correction function. The focus corrector changes the focus correction function in accordance with information relating to an operation of the shutter mechanism.

Further features and aspects of the present invention will become apparent from the following description of exemplary embodiments with reference to the attached drawings.

DESCRIPTION OF THE PREFERRED EMBODIMENTS

Exemplary embodiments of the present invention will be described below with reference to the accompanied drawings.

Figure 1:
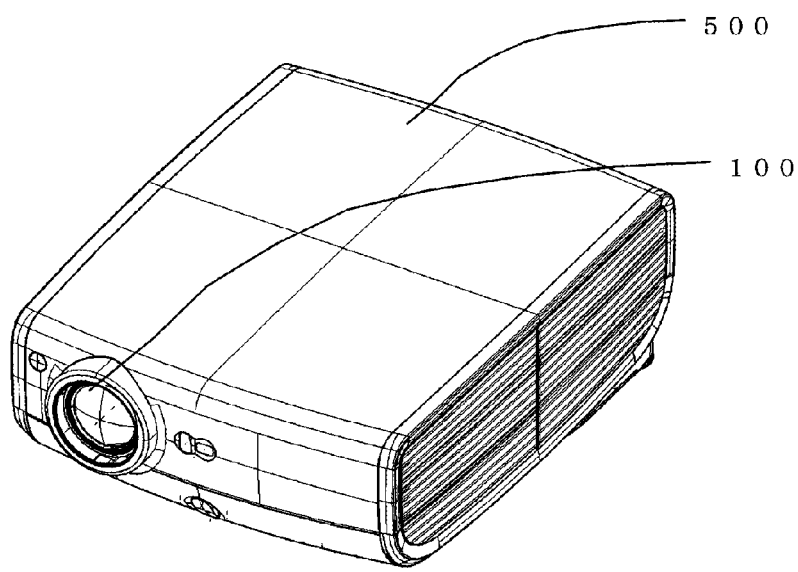
FIG. 1 is an external view of a liquid crystal projector that is an embodiment of the present invention.

FIG. 1 illustrates an appearance of a projector 500 as an image projection apparatus that is an embodiment of the present invention. Reference numeral 100 denotes a projection lens.

Figure 2:
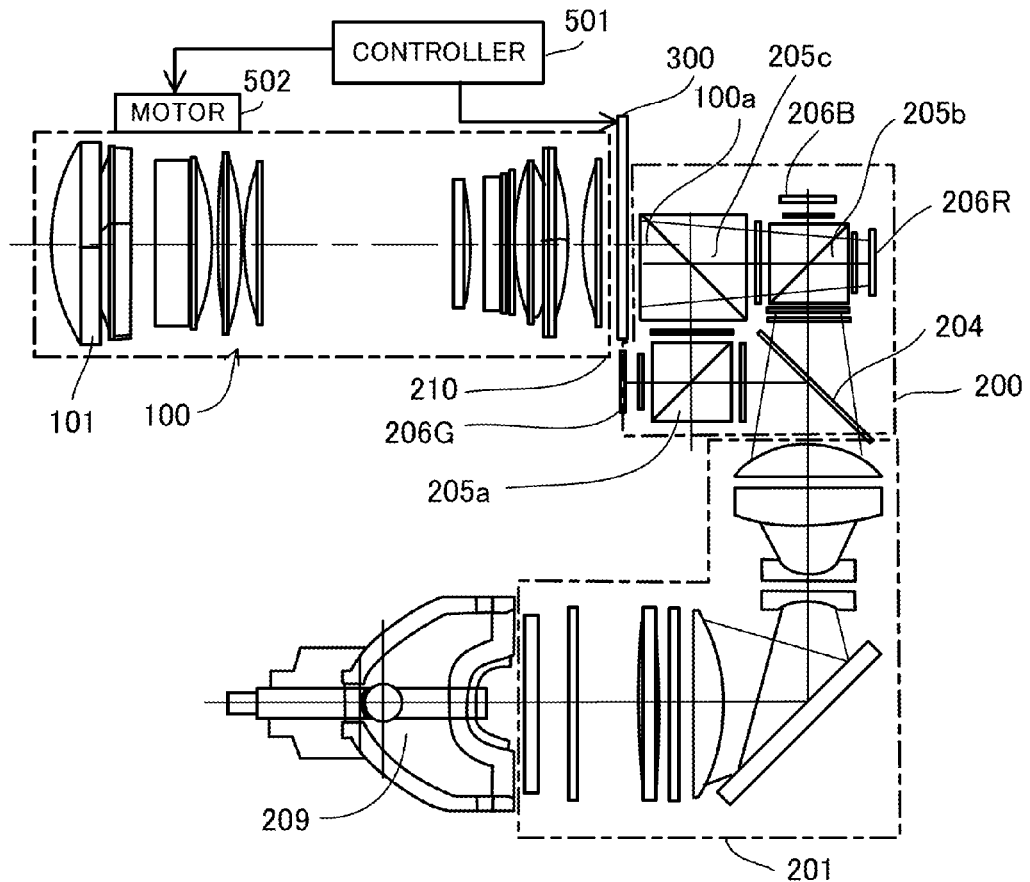
FIG. 2 is a side view illustrating an optical configuration of a liquid crystal projector of the embodiment.

FIG. 2 illustrates a configuration of an optical system which is housed in a chassis of the projector 500. In the chassis of the projector 500, an optical box containing a light source lamp 209, a color separation/combination optical unit 200, an illumination optical system 201, and liquid crystal panels (optical modulation elements) 206R, 206G, and 206B is housed. In the chassis, the projection lens 100 described above and a shutter unit (a shutter mechanism) 300 are also housed.

The projection lens 100 includes a plurality of lens units (optical elements) and a holding member which holds them, and is attached to an opening of the optical box which is used for emitting light. The shutter unit 300 is disposed between the color separation/combination optical unit 200 in the optical box and the projection lens 100.

A liquid crystal panel driver (not shown) is coupled to the liquid crystal panels 206R, 206G, and 206B. The liquid crystal panel driver forms an original image on the liquid crystal panels 206R, 206G, 206B in accordance with image information which is inputted from an image providing apparatus such as a personal computer, a DVD player, or a TV tuner (not shown) to the projector 500. Light modulated by the liquid crystal panels 206R, 206G, and 206B is projected on a projection surface such as a screen by the projection lens 100. The liquid crystal panels 206R, 206G, and 206B are reflective liquid crystal panels.

The illumination optical system 201 guides light from the light source lamp 209 to the color separation/combination optical unit 200. The color separation/combination optical unit 200 separates the light from the illumination optical system 201 into three color lights of R, G, and B to be guided to the liquid crystal panels 206R, 206G, and 206B, and combines the three color lights from the liquid crystal panels 206R, 206G, and 206B to be guided to the projection lens 100.

The shutter unit 300 operates so as to change an open state and a closed state to open and block an optical path of light which heads from the color separation/combination optical unit 200 to the projection lens 100. The shutter unit 300 is different from a stop (not shown) which is provided inside the projection lens 100. The opening of the stop is not completely closed even if an amount of the opening is minimized, and the stop only adjusts the intensity of the light projected on the projection surface. On the other hand, the opening of the shutter unit 300 is completely closed in the closed state so that the light is not projected on the projection surface.

The illumination optical system 201 includes a fly-eye lens and a condenser lens that have a function of dividing the light from the light source lamp 209 which is a high-brightness discharge lamp such as an ultrahigh pressure mercury lamp into a plurality of light beams, and of overlapping the light beams on each liquid crystal panel. The illumination optical system 201 includes a polarization conversion element which changes the light from the light source lamp 209 to polarized light (P-polarized light in the embodiment) having a predetermined polarization direction.

The color separation/combination optical unit 200 includes a dichroic mirror 204, first to third polarization beam splitters 205a to 205c, and a holding member (not shown) that holds these optical elements. The dichroic mirror 204 transmits blue (B) and red (R) color lights and reflects green (G) color light of white light from the illumination optical system 201, i.e. the light source lamp 209. The first and second polarization beam splitters 205a and 205b transmit P-polarized light and reflect S-polarized light. The third polarization beam splitter 205c is a color combining prism that has both functions as a dichroic prism which transmits the G light and reflects the B light and as a polarization beam splitter which transmits the P-polarized light and reflects the S-polarized light with respect to the R light.

The G light as P-polarized light which is reflected on the dichroic mirror 204 and transmits through the first polarization beam splitter 205a enters the green liquid crystal panel 206G to be reflected and modulated into S-polarized light. Then, it is reflected on the first polarization beam splitter 205a to enter the third polarization beam splitter 205c.

The R light that has transmitted through the dichroic mirror 204 rotates its polarization direction by 90 degrees by a color selective phase difference plate to be S-polarized light to enter the second polarization beam splitter 205b. The R light reflected on the second polarization beam splitter 205b enters the red liquid crystal panel 206R to be reflected and modulated to be P-polarized light. Then, it transmits through the second polarization beam splitter 205b to enter the third polarization beam splitter 205c.

The B light that has transmitted through the dichroic mirror 204 passes through the color selective phase difference plate without rotating its polarization direction to enter the second polarization beam splitter as P-polarized light. The B light that has transmitted through the second polarization beam splitter 205b enters the blue liquid crystal panel 206B to be reflected and modulated to be S-polarized light. Then, it is reflected on the second polarization beam splitter 205b to enter the third polarization beam splitter 205c.

The third polarization beam splitter 205c, as described above, transmits the G light and also reflects the B light, and further it transmits the incident R light as P-polarized light to combine these G light, B light, and R light to be guided to the projection lens 100. R, G, and B images formed by the R, G, and B lights, respectively, are projected on the projection surface with an overlap to display a full color image on the projection surface.

An optical axis 100a of the projection lens 100 is shifted to an upper side with respect to the third polarization beam splitter 205c, i.e. an exit optical axis 210 of the color separation/combination optical unit 200 (an upper side when the projector 500 is set up on a table). Thus, vignetting is not performed for a part of the lower side of the light projected from the projection lens 100 onto the projection surface by the table.

In the projector 500 configured as described above, when the shutter unit 300 is in the open state, the light from the light source lamp 209 enters the projection lens 100 via the color separation/combination optical unit 200. Therefore, the temperature of the projection lens 100 or the color separation/combination optical unit 200 increases, and a focus state of a projection image varies in accordance with the change of the refractive index of an optical element such as a lens unit or a prism which constitute them or an interval of the optical elements due to the temperature increase.

On the other hand, when the shutter unit 300 is in the closed state, the light from the light source lamp 209 is blocked by the shutter unit 300 so as not to enter the projection lens 100 and so as to enter the color separation/combination optical unit 200. Furthermore, the light reflected on the shutter unit 300 also enters the color separation/combination optical unit 200. Therefore, when the shutter unit 300 is in the closed state, the temperature of the projection lens 100 is decreased, but the temperature of the color separation/combination optical unit 200 is increased. When the shutter unit 300 is open next time, the variation of the focus state of the projection image with reference to that in the previous closed state (hereinafter, referred to as a focus variation) is generated.

As illustrated in FIG. 2, the projection lens 100 is provided with a motor 502 which moves a focus lens unit 101 that is a part of a plurality of lens units constituting the projection lens 100 in an optical axis direction. The operation of the motor 502 is controlled by a controller 501 which is constituted by a CPU or the like. The focus lens unit 101 is moved via the motor 502 to be able to change the focus state of the projection image on the projection surface.

Accordingly, even if the focus variation caused by the temperature change of the projection lens 100 or the color separation/combination optical unit 200 is generated as described above, the focus lens unit 101 is appropriately moved to be able to well correct the focus variation.

Hereinafter, the operation of moving the focus lens unit 101 via the motor 502 in the optical axis direction to correct the focus variation caused by the temperature change is referred to as a focus correction operation of the projection lens 100. The controller 501 functions as a focus corrector.

The moving distance of the focus lens 101 in the focus correction operation is determined so as to correspond to a focus correction amount that is calculated by using first to fourth focus correction functions described below. In other words, the focus correction operation of the projection lens 100 is performed based on the first to fourth focus correction functions.

A used focus correction function of the first to fourth focus correction functions is selected (changed) based on information relating to the operation of the shutter unit 300. The information relating to the operation of the shutter unit 300 is information on indicating whether the shutter unit 300 is currently in the open state or the closed state, or on indicating an operation log of the shutter unit 300. The operation log means that for example the shutter unit 300 is never closed after the light source lamp 209 starts to light up (the open state is maintained) or the shutter unit 300 is open again after it is closed from the open state once.

The projector 500 may also have an AF function which detects the distance up to the projection surface and the focus state of the projection image using reflected light from the projection surface onto which an image has been projected, and moves the focus lens unit 101 via the motor 502 to automatically perform focusing.

Figure 3:
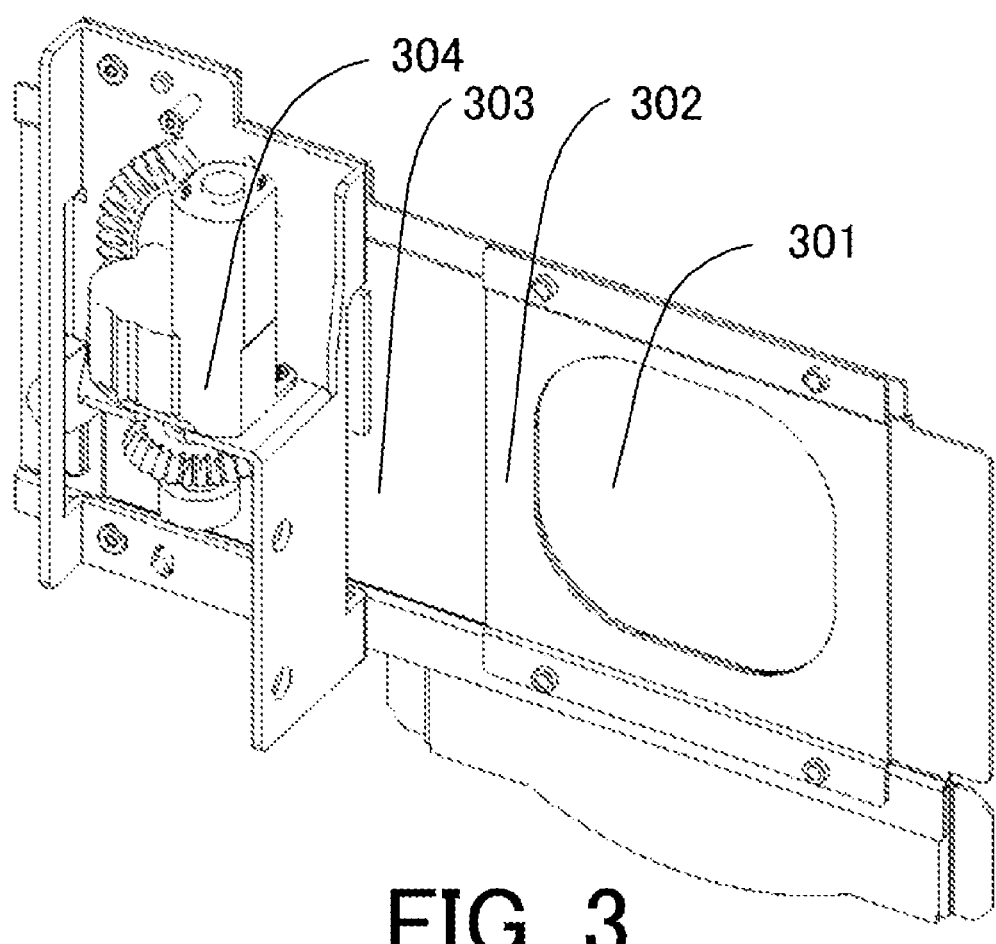
FIG. 3 is a perspective view of a shutter unit which is used for a liquid crystal projector of the embodiment.

FIG. 3 illustrates a configuration of the shutter unit 300. Reference numeral 302 denotes a window frame member. A window (an opening) 301 through which light heading from the color separation/combination optical unit 200 to the projection lens 100 passes is formed in the window frame member 302. Reference numeral 303 denotes a shutter plate as a light shielding member which is movably held by the window frame member 302 in an opening and closing direction of the window 301. FIG. 3 illustrates the open state where the shutter plate 303 is placed at a position of opening the window 301. When the shutter plate 303 in the open state is moved to a position where it closes the window 301, the open state is changed to the closed state. Reference numeral 304 denotes an actuator that moves the shutter plate 303. The operation of the actuator 304, i.e. the opening and closing operation of the shutter unit 300, is controlled by the controller 501 illustrated in FIG. 1.

Figure 4:
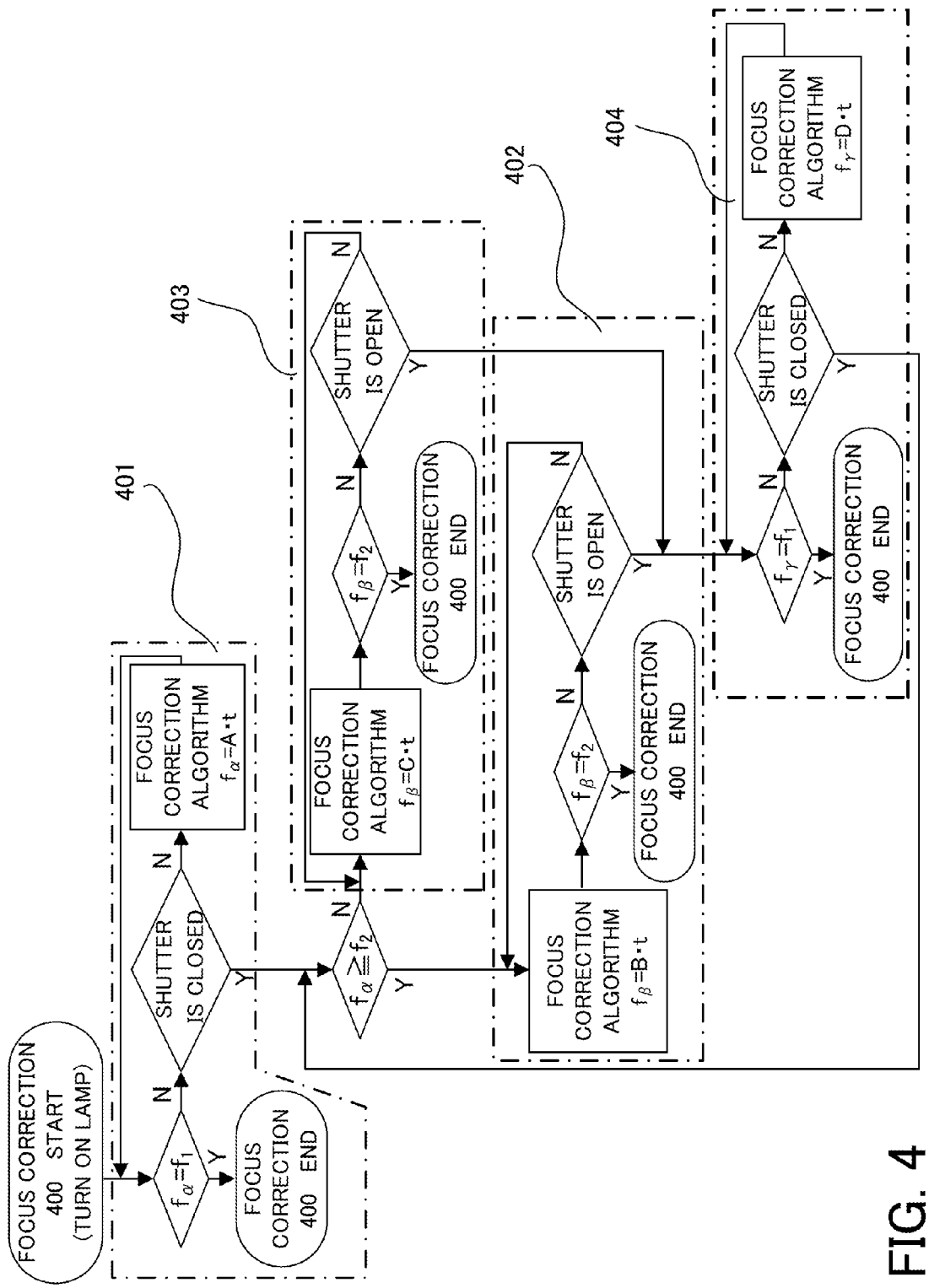
FIG. 4 is a flowchart illustrating an operation of a liquid crystal projector of the embodiment.
Figure 5:
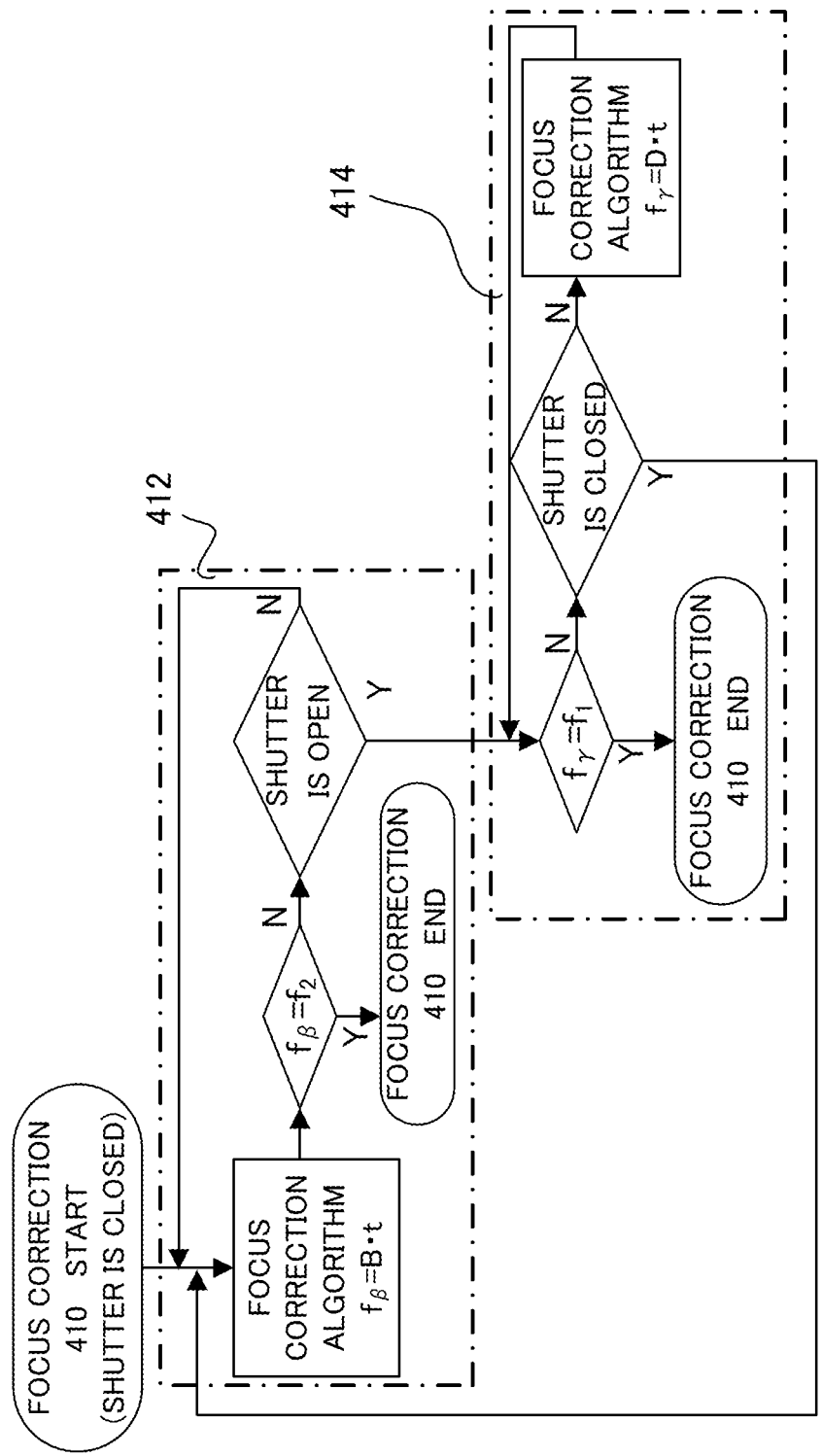
FIG. 5 is a flowchart illustrating an operation of a liquid crystal projector of the embodiment.
Figure 6:
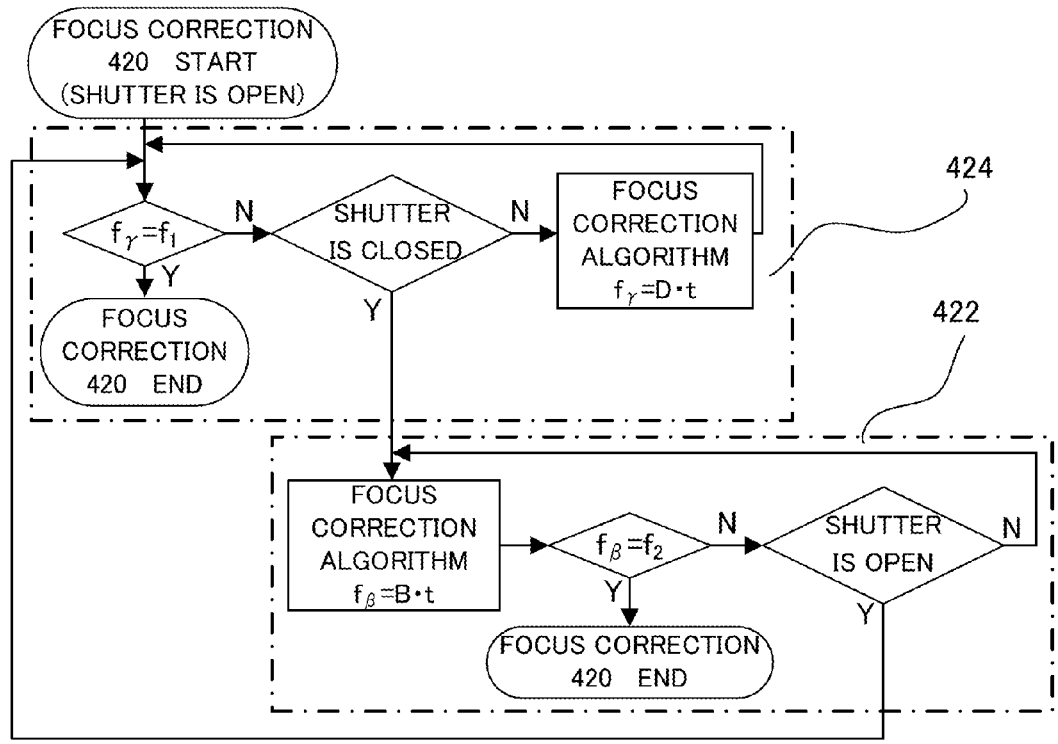
FIG. 6 is a flowchart illustrating an operation of a liquid crystal projector of the embodiment.

The flowcharts of FIGS. 4 to 6 illustrate processes of controlling the focus correction operations of the projection lens 100 in the present embodiment (focus correction processes). The controller 501 corrects the focus variation which is generated by the temperature changes of the color separation/combination optical unit 200 and the projection lens 100 which receive the light from the light source lamp 209 by performing the focus correction operation of the projection lens 100 based on a focus correction function described below. The controller 501 performs the focus correction process in accordance with a computer program.

FIG. 4 illustrates a focus correction process 400 which is started by the controller 501 simultaneously with the start of lighting up the light source lamp 209.

Figure 7:
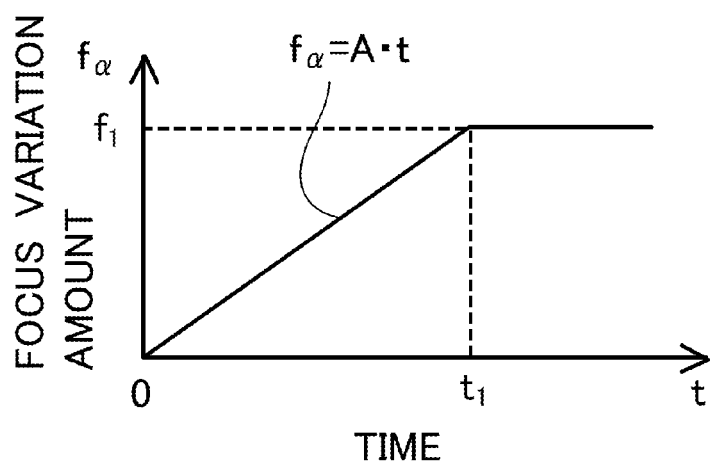
FIG. 7 is a diagram illustrating a first focus correction function $f_\alpha = A \cdot t$ which is used in the embodiment.

In Step 401, the controller 501 calculates a focus correction amount $f_\alpha$ using a first focus correction function $f_\alpha = A \cdot t$ which is represented by a time t elapsed from the start of lighting up the light source lamp 209 and a coefficient A. In other words, the focus correction amount $f_\alpha$ is calculated by a first focus correction algorithm using the first focus correction function $f_\alpha = A \cdot t$. The first focus correction function $f_\alpha = A \cdot t$ is used when the shutter unit 300 is never closed from the start of lighting up the light source lamp 209. FIG. 7 illustrates a focus correction function $f_\alpha = A \cdot t$.

The coefficient A is obtained by measured values of the time t and the focus correction amount $f_\alpha$ in the real projector or a simulation result. This is true for coefficients B, C, and D of different focus correction functions described below. The coefficients A to D have values and signs (a positive or a negative) different from each other. The present embodiment will describe a case where A, C, and D are positive values different from each other and B is negative value, but it is an example and they can be arbitrarily determined based on the measured values and the simulation result as described above.

The temperature increases of the color separation/combination optical unit 200 and the projection lens 100 caused by the light from the light source lamp 209 is saturated at a certain value. Therefore, a focus variation amount is also saturated at a certain value. The focus variation amount at the time of saturation is defined as $f_1$, and the controller 501 finishes the focus correction process 400 at the time $t_1$ at which $f_\alpha = f_1$ is met.

When the shutter unit 300 is closed before $f_\alpha = f_1$ is met, i.e. the open state is switched to the closed state, the controller 501 proceeds to Step 402 or Step 403. Because the light from the light source lamp 209 does not enter the projection lens 100 in a state where the shutter unit 300 is closed, the temperature of the lens unit or the holding member inside the projection lens 100 does not increase. A focus variation amount saturated at this time is defined as $f_2$. The controller 501 proceeds to Step 402 when $f_\alpha \geq f_2$ is met, and on the other hand, it proceeds to Step 403 when $f_\alpha < f_2$ is met.

Figure 8:
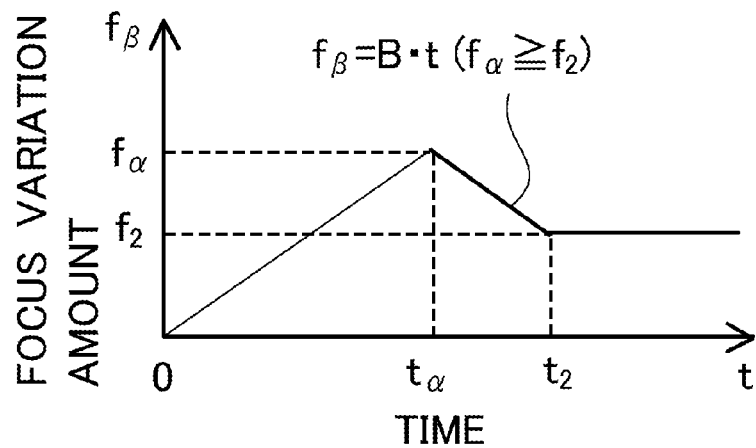
FIG. 8 is a diagram illustrating a second focus correction function $f_\beta = B \cdot t$ which is used in the embodiment.

In Step 402, the controller 501 calculates a focus correction amount $f_\beta$ using a second focus correction function $f_\beta = B \cdot t$ which is represented by the time t and the coefficient B. In other words, the focus correction amount is calculated by a second focus correction algorithm using the second focus correction function $f_\beta = B \cdot t$. FIG. 8 illustrates the second focus correction function $f_\beta = B \cdot t$ when the shutter unit 300 is closed at a time $t_\alpha$ at which the focus correction amount becomes $f_\alpha$ in Step 401.

Figure 9:
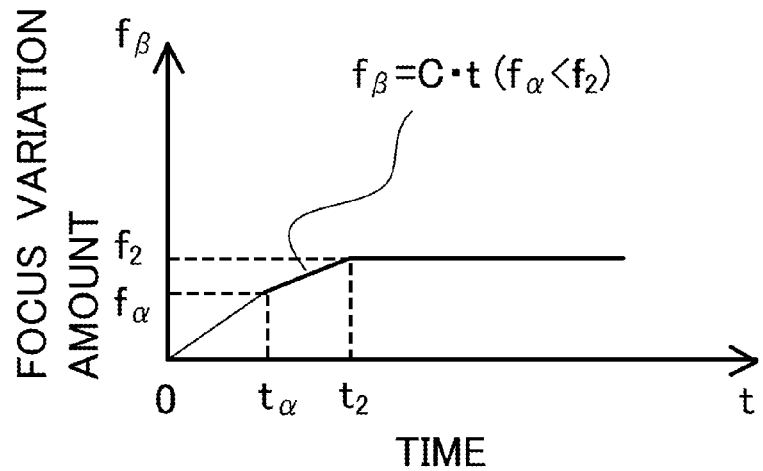
FIG. 9 is a diagram illustrating a third focus correction function $f_\beta = C \cdot t$ which is used in the embodiment.

In Step 403, the controller 501 calculates a focus correction amount $f_\beta$ using a third focus correction function $f_\beta = C \cdot t$ which is represented by the time t and the coefficient C. In other words, the focus correction amount $f_\beta$ is calculated by a third focus correction algorithm using the third focus correction function $f_\beta = C \cdot t$. FIG. 9 illustrates the third focus correction function $f_\beta = C \cdot t$ when the shutter unit 300 is closed at the time $t_\alpha$ at which the focus correction amount becomes $f_\alpha$ in Step 401.

In Step 402 and Step 403, the controller 501 finishes the focus correction process 400 at a time $t_2$ at which $f_\beta = f_2$ is met. When the shutter unit 300 is open before $f_\beta = f_2$ is met, it proceeds to Step 404.

In Step 404, the temperature increases of the optical element such as a lens unit or a prism and the holding member that holds it inside the projector 500 caused by the light from the light source lamp 209 are generated as similarly to the case of Step 401. Therefore, the saturated focus variation amount becomes $f_1$. However, since the shutter unit 300 is open again after it is closed in the open state once, i.e. the state is changed from the closed state to the open state, the temperature distributions of the optical element and the holding member inside the projector 500 are different from those in Step 401.

Figure 10:
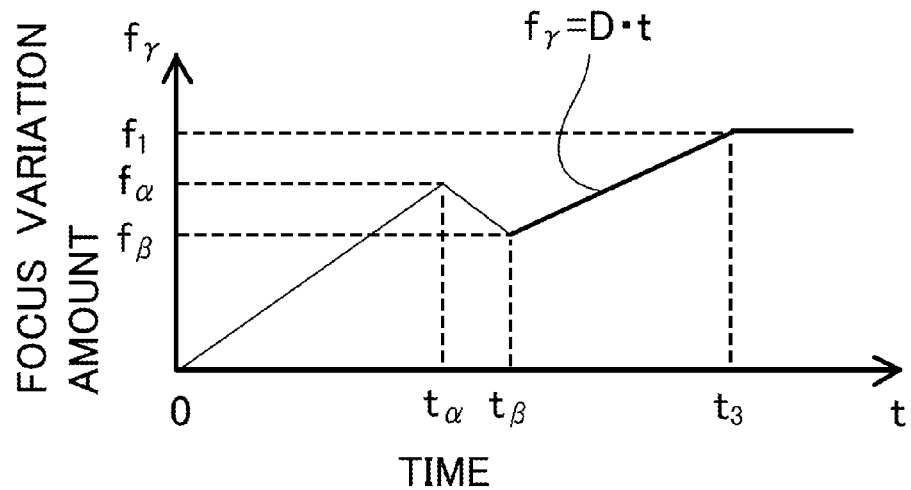
FIG. 10 is a diagram illustrating a fourth focus correction function $f_\gamma = D \cdot t$ which is used in the embodiment.

Therefore, in Step 404, the controller 501 calculates a focus correction amount $f_\gamma$ using a fourth focus correction function $f_\gamma = D \cdot t$ which is represented by the time t and the coefficient D. In other words, the focus correction amount $f_\gamma$ is calculated by a fourth focus correction algorithm using the fourth focus correction function $f_\gamma = D \cdot t$. FIG. 10 illustrates the fourth focus correction function $f_\gamma = D \cdot t$ when the shutter unit 300 is closed at the time $t_\beta$ at which the focus correction amount becomes $f_\alpha$ in Step 401 and then the shutter unit 300 is open at the time $t_\beta$ at which the focus correction amount becomes $f_\beta$ in Step 402 or Step 403. The controller 501 finishes a focal position correction algorithm 400 at a time $t_3$ at which $f_\gamma = f_1$ is met.

When the shutter unit is closed before $f_\gamma = f_1$ is met, the controller 501 proceeds to Step 402 or Step 403. Whether it proceeds to Step 402 or Step 403 is determined as similarly to the above case. The controller 501 continues the focus correction process 400 described above until $f_\alpha = f_1$ and $f_\beta = f_2$ or $f_\gamma = f_1$ are met.

Next, referring to FIG. 5, a focus correction process 410 which is started by the controller 501 simultaneously with closing the shutter unit 300 will be described. The focus correction process 410 is performed on condition that the focus correction process 400 of FIG. 4 has finished, i.e. $f_\alpha = f_1$ and $f_\beta = f_2$ or $f_\gamma = f_1$ are met.

First of all, the controller 501 proceeds to Step 412. Because the light from the light source lamp 209 does not enter the projection lens 100 in a state where the shutter unit 300 is closed, the temperatures of the lens unit and the holding member inside the projection lens 100 do not increase. In other words, the focus variation similar to that in Step 402 of FIG. 4 is generated.

Therefore, in Step 412, the controller 501 obtains the focus correction amount $f_\beta$ using the second focus correction function $f_\beta = B \cdot t$. Then, similarly to the case of Step 402, the controller 501 finishes the focus correction process 410 at the time $t_2$ at which $f_\beta = f_2$ is met.

The temperature increase generated in the projection lens 100 by receiving the light from the light source lamp 209 significantly influences the focus variation amount. Therefore, in the focus correction process 410 which is performed by closing the shutter unit 300 after the focus correction process 400 has finished, $f_1 > f_2$ is always met due to the position of the shutter unit 300 described above. Accordingly, the focus variation amount at the start time of the focus correction process 410 is always greater than $f_2$. Thus, in the focus correction process 410, it is not necessary to assume $f_\alpha < f_2$ that is a condition to proceed to Step 403 in the focus correction process 400.

In Step 412, when the shutter unit 300 is open before $f_\beta = f_2$ is met, the controller 501 proceeds to Step 414. In Step 414, the shutter unit 300 is open after it is closed once. Therefore, similarly to the case of Step 404 in FIG. 4, the controller 501 calculates the focus correction amount $f_\gamma$ using the fourth focus correction function $f_\gamma = D \cdot t$. The controller 501 finishes the focus correction process 410 at the time of meeting $f_\gamma = f_1$. When the shutter unit 300 is closed before $f_\gamma = f_1$ is met, the controller 501 proceeds to Step 412.

The controller 501 continues the focus correction process 410 described above until $f_\beta = f_2$ or $f_\gamma = f_1$ is met.

Next, referring to FIG. 6, a focus correction process 420 which is started by the controller 501 simultaneously with opening the shutter unit 300 will be described. The focus correction process 420 is performed on condition that the focus correction process 400 or 410 has finished, i.e. $f_\alpha = f_1$ and $f_\beta = f_2$ or $f_\gamma = f_1$ are met.

First of all, the controller 501 proceeds to Step 424. In Step 424, the shutter unit 300 is open after it is closed once. Therefore, the controller 501, similarly to the case of Step 404 in FIG. 4, calculates the focus correction amount $f_\gamma$ using the fourth focus correction function $f_\gamma = D \cdot t$. The controller 501 finishes the focus correction process 420 at the time of meeting $f_\gamma = f_1$.

When the shutter unit 300 is closed before $f_\gamma = f_1$ is met, the controller 501 proceeds to Step 422. At this time, the temperatures of the lens unit and the holding member in the projection lens 100 do not increase because the shutter unit 300 is closed and the light from the light source lamp 209 does not enter the projection lens 100. Accordingly, in Step 422, similarly to the case of Step 402 in FIG. 4, the controller 501 calculates the focus correction amount $f_\beta$ using the second focus correction function $f_\beta = B \cdot t$. The controller 501 finishes the focus correction process 420 at the time of meeting $f_\beta = f_2$.

As described above, the temperature increase generated in the projection lens 100, caused by receiving the light from the light source lamp 209, significantly influences the focus variation amount. Therefore, in the focus correction process 420 which is performed by opening the shutter unit 300 after the focus correction process 400 or 410 has finished, $f_1 > f_2$ is always met due to the position of the shutter unit 300 described above. Accordingly, the focus variation amount at the time of starting the focus correction process 420 is inevitably greater than $f_2$. Thus, also in the focus correction process 420, it is not necessary to assume $f_\alpha < f_2$ that is a condition to proceed to Step 403 in the focus correction process 400.

When the shutter unit 300 is open before $f_\beta = f_2$ is met, the controller 501 proceeds to Step 424.

The controller 501 continues the focus correction process 420 described above until $f_\beta = f_2$ or $f_\gamma = f_1$ is met.

As described above, in the present embodiment, the focus variation generated by the temperature changes of the color separation/combination optical unit 200 and the projection lens 100 are corrected by the operation based on the focus correction function. Then, the used focus correction function of the first to fourth focus correction functions is changed in accordance with the information relating to the operation of the shutter unit 300. In particular, the used focus function is changed between the case in which the open state of the shutter unit 300 is maintained, i.e. the shutter unit 300 is never closed, and the case in which the shutter unit 300 is operated in the open state again after it is in the closed state once, after the light source lamp 209 is turned on.

Thus, the used focus correction function is changed in accordance with the information relating to the operation of the shutter unit 300 to be able to perform the appropriate focus correction depending upon the operation of the shutter unit 300. As a result, a focused image can be projected independently of the operation of the shutter unit 300.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, in the above embodiment, the case in which the focus correction function is changed in accordance with the information containing the operation log as well as the opening and closing state of the shutter unit 300 is described, and more simply the focus correction function may be changed only in accordance with the opening and closing state.

In the above embodiment, the case in which the reflective liquid crystal panel is used as an optical modulation element, and a different modulation element such as a transmissive liquid crystal panel or a digital micromirror device may also be used.

According to the present embodiment, an image projection apparatus which projects a focused image independently of the operation of the shutter mechanism can be provided.

This application claims the benefit of Japanese Patent Application No. 2009-262643, filed on Nov. 18, 2009, which is hereby incorporated by reference herein in its entirety.

What is claimed is:

1. An image projection apparatus comprising:
an optical modulation element;
a projection lens configured to project light modulated by the optical modulation element onto a projection surface;
an optical unit configured to guide light from a light source to the optical modulation element and to guide the light from the optical modulation element to the projection lens;
a shutter mechanism disposed between the optical unit and the projection lens and configured to operate so as to be in an open state and a closed state; and
a focus corrector configured to correct a focus variation generated by temperature changes of the optical unit and the projection lens by operating the projection lens based on a focus correction function,
wherein the focus corrector changes the focus correction function in accordance with information relating to an operation of the shutter mechanism, and
wherein the information relating to the operation of the shutter mechanism contains information indicating whether the shutter mechanism is in the open state or the closed state, and information indicating an operation log of the shutter mechanism.

2. An image projection apparatus according to claim 1, wherein the focus corrector changes the focus correction function between a case in which the open state of the shutter mechanism is maintained and a case in which the shutter mechanism operates so as to be in the open state again after the shutter mechanism changes the open state to the closed state.

3. An image projection apparatus according to claim 2, wherein that the open state of the shutter mechanism is maintained represents that the shutter unit is never closed after the light source is turned on.

4. An image projection apparatus according to claim 1, wherein the focus correction function is represented by a time and a coefficient.

5. An image projection apparatus according to claim 1, wherein, when one of the open state and the close state of the shutter mechanism is changed to the other, the focus corrector changes the focus correction function in accordance with the one of the open state and the close state of the shutter mechanism.

6. An image projection apparatus according to claim 1, wherein the focus correction function for operating the projection lens is different between a case in which the open state of the shutter mechanism is maintained after the light source is turned on and a case in which the shutter mechanism is changed from the closed state to the open state.

7. An image projection apparatus according to claim 1, wherein the focus corrector operates the projection lens based on at least three focus correction functions which are different from each other, according to the operation log of the shutter mechanism.

8. An image projection apparatus according to claim 1, wherein the focus corrector operates the projection lens based on a time elapsed from when the light source is turned on.

9. An image projection apparatus according to claim 1, wherein the shutter mechanism is located closer to the projection lens than the optical modulation element.

10. An image projection apparatus comprising:
an optical modulation element;
a projection lens configured to project light modulated by the optical modulation element onto a projection surface;
an optical unit configured to guide light from a light source to the optical modulation element and to guide the light from the optical modulation element to the projection lens;
a shutter mechanism disposed between the optical unit and the projection lens and configured to operate so as to be in an open state and a closed state; and
a focus corrector configured to correct a focus variation generated by temperature changes of the optical unit and the projection lens by operating the projection lens based on a focus correction function,
wherein the focus corrector sets a first saturated focus variation amount and a second saturated focus variation amount, the first saturated focus variation amount being a focus variation amount which is saturated when the light source is turned on and the shutter mechanism is an open state, and the second saturated focus variation amount being a focus variation amount which is saturated when the light source is turned on and the shutter mechanism is in a closed state, and
wherein the focus corrector changes the focus correction function so that the focus variation amount is gradually equal to the first saturated focus variation amount when the light source is turned on and the shutter mechanism is an open state, and changes the focus correction function so that the focus variation amount is gradually equal to the second saturated focus variation amount when the light source is turned on and the shutter unit is in a closed state.

11. An image projection apparatus according to claim 10, wherein the focus corrector changes the focus correction function further based on information indicating an operation log of the shutter mechanism.

12. An image projection apparatus according to claim 10, wherein the focus corrector changes the focus correction function between a case in which the open state of the shutter mechanism is maintained and a case in which the shutter mechanism operates so as to be in the open state again after the shutter mechanism changes the open state to the closed state.

13. An image projection apparatus according to claim 10, wherein the focus correction function is represented by a time and a coefficient.

* * * * *